Jan. 5, 1943. R. E. THOMPSON 2,307,430
APPARATUS FOR MAKING POWDER PUFFS
Filed May 15, 1939 7 Sheets-Sheet 1

Inventor
Richard E. Thompson
By
Mauro & Lewis
Attorneys

Jan. 5, 1943. R. E. THOMPSON 2,307,430
APPARATUS FOR MAKING POWDER PUFFS
Filed May 15, 1939 7 Sheets-Sheet 2

Inventor
Richard E. Thompson
By Mauro & Lewis
Attorneys

Jan. 5, 1943.  R. E. THOMPSON  2,307,430
APPARATUS FOR MAKING POWDER PUFFS
Filed May 15, 1939  7 Sheets-Sheet 3

Inventor
Richard E. Thompson

By Mauro & Lewis
Attorneys

Jan. 5, 1943.  R. E. THOMPSON  2,307,430
APPARATUS FOR MAKING POWDER PUFFS
Filed May 15, 1939  7 Sheets-Sheet 7

INVENTOR.
Richard E. Thompson
BY
Mauro + Lewis
ATTORNEYS.

Patented Jan. 5, 1943

2,307,430

UNITED STATES PATENT OFFICE 2,307,430

APPARATUS FOR MAKING POWDER PUFFS

Richard E. Thompson, Brooklyn, N. Y.

Application May 15, 1939, Serial No. 273,783

12 Claims. (Cl. 112—2)

This invention relates to powder puffs and method and apparatus for producing the same.

Powder puffs such as now commonly on the market are made by superposing two circular discs of suitable material, such as velours, with the knap or pile sides or faces of the discs in contact, that is, wrong side out in respect to their position in the finished article. The discs so superposed are then presented to a sewing machine and secured together by a line of stitches formed by such machine about a quarter of an inch inside of the peripheral edges of the discs. The line of stitches is not continued completely around the peripheral edges of the discs but is discontinued to leave a sufficient opening through which the discs, or what is a bag at this stage of the operation, are turned right side out, that is, with the knap or pile sides or faces out. A suitable filling, such as cotton fiber, is then introduced through the opening and distributed between the discs to constitute a filling of as uniform density and thickness as it may be possible to obtain by such procedure. The opening left at the edges of the discs by discontinuing the machine-made stitches is then closed by hand-formed stitches.

The general objects of the present invention are the provision of an improved powder puff and method and apparatus for producing the same at minimum cost. These and other objects and advantages realized by the invention will be readily understood by reference to the accompanying drawings illustrative thereof and from the detailed description which follows.

This application is a continuation-in-part of my copending application Serial Number 40,483, filed Sept. 13, 1935 entitled Powder puffs and method for making the same (U. S. Patent No. 2,190,894).

In said drawings—

Figs. 12 to 29, inclusive, show more specifically a preferred embodiment of apparatus or powder puff feeding mechanism in accordance with the present invention and whereof—

Figs. 18–20 show the special parts employed to produce a powder-puff with a ribbon extending around its periphery such as shown in Figs. 5 and 6, and whereof:

Figure 7:
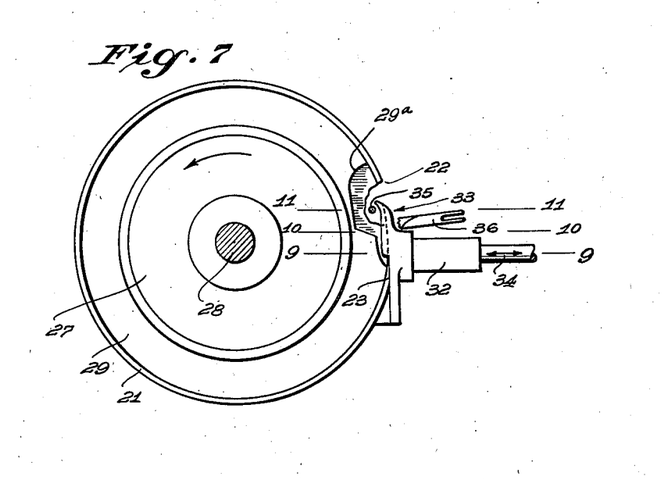
Fig. 7 is a top plan view of apparatus in accordance with the invention.
Figure 8:
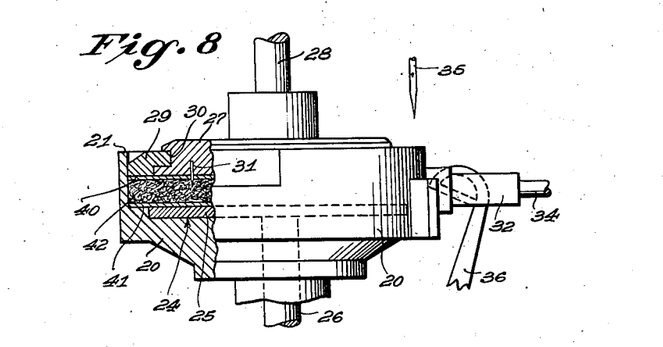
Fig. 8 is a side elevation of Fig. 7, partly in vertical section.

Referring to Figs. 7 to 11, 20 is a stationary circular cup-like support including in its construction an upstanding peripheral flange 21 which is broken away or omitted between the points 22 and 23 to provide space for a part of the apparatus presently described. The bottom of said support has a circular recess 24 in which a circular plate 25 is rotatable by means of a vertical shaft 26 to the upper end of which said plate 25 is secured. 27 is a circular top plate secured to the lower end of an upper vertical shaft 28 by which said plate is rotated. A stationary ring 29 engages in a groove 30 around the periphery of plate 27 and has a recess 29ª at one side thereof (Fig. 7). A number of pins 31 (only one of which is shown in Fig. 8) are fixed to and distributed over the bottom surface of plate 27 and have downwardly projecting sharp points.

A horizontal tubular stationary bearing 32, open at both ends, fits against and is secured to the periphery of support 20 and has thereon, preferably as an integral part thereof, a horizontal tapered finger or tongue 33 positioned in the space between the points 22 and 23 of flange 21. Finger 33 projects in the direction of rotation (indicated by the arrow on Fig. 7) of the plates 25 and 27 and their shafts 26 and 28 respectively. Tongue 33 has a concave inner face, as clearly shown. 34 is a pusher supported by and reciprocated in bearing 32 by suitable means not shown.

Figure 11:
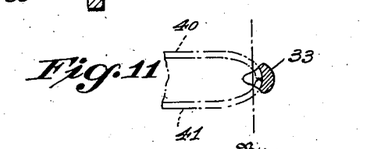

35 is a fabric penetrating vertically reciprocating thread-carrying needle, the path of travel of which is close to and just back of the point of the finger 33, as shown in Fig. 7 and by dot-and-dash line in Fig. 11. 36 is a thread-carrying looper which cooperates with the needle, in a manner well known in respect to machines for forming overedge or overcast stitches, that is, stitches including thread which is carried one or more times around the edge of the fabric at each stitch. The means for imparting movements to the needle 35 and the looper 36 is not shown, but may be of a character well known in overseaming machines such as are on the market. The shaft 26 and its plate 25 and the shaft 28 and its plate 27, with materials (such as described hereinafter) to be formed into a pad interposed between the plates 25 and 27 and penetrated by the pins 31 to insure rotation with the plates between which said materials are clamped, are rotated intermittently (in the direction of the arrow shown in Fig. 7) or step-by-step, or stitch-by-stitch, by suitable means of well known character but not shown in the drawings. Such intermittent feed movements take place while the needle is up and out of the materials for forming the pad and the looper is in corresponding position. In this manner the peripheral edges of the materials of which the pad is to be constituted are fed to and by the needle and stitches are formed therein.

Figures 1, 2:
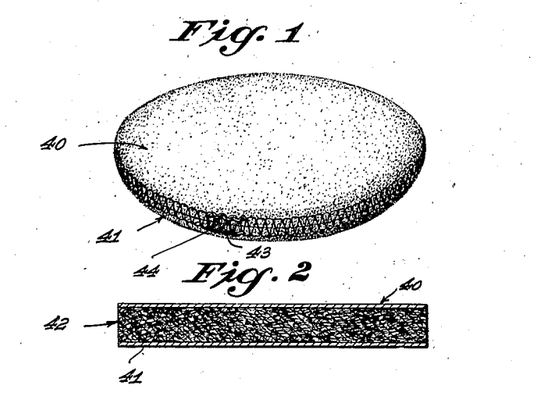
Fig. 1 is a perspective view of a powder puff of the present invention.
Fig. 2 is a cross-sectional view showing the first stage of the method of producing the puff of Fig. 1.

In the method of producing powder puffs according to the present invention and as illustrated in the drawings, two circular discs 40 and 41 of suitable fabric, such as velours, are brought together with an interposed circular body of fiber 42 (such as cotton fiber) and with the right sides of the fabric discs (that is, the pile or knap sides) out. As shown in Fig. 2, the fabric discs and the cotton filling are all of the same diameter, which is approximately the diameter of the finished pad made therefrom. The filling is preferably made from cotton fiber in sheet form and of approximately uniform thickness and density. The fabric discs and the circular cotton filling may be formed separately and then assembled in the relationship to each other shown in Fig. 2, or they may be stamped or cut in one operation from previously superposed sheets of fabric and interposed cotton filling. The outline or shape of the fabric discs or pieces, such as 40 and 41, as well as the cotton filler 42, may be other than circular if desired.

Figure 3:
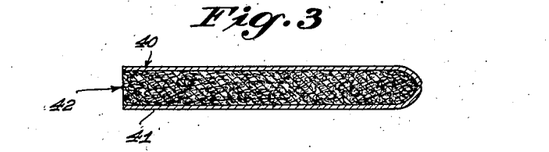
Fig. 3 is a similar view of the next stage of said method.
Figure 4:
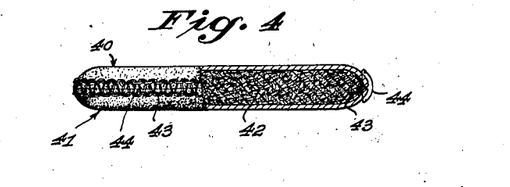
Fig. 4 is a similar view of the final stage of said method.

The assembled fabric discs and cotton filling of Fig. 2 are next placed and clamped between the rotatable plates 24 and 27, as shown in Fig. 3. As said plates, and with them the fabric and cotton discs, are rotated intermittently, the peripheral edges of said discs are carried step-by-step past the inner open end of the tubular bearing 32, the tongue 33 and the needle 35. The pusher 34 is so actuated that during each period of rest between feed movements it is moved forward to the approximate position shown in dotted lines in Fig. 9 and then retracted to the approximate position shown in full lines in said figure. By such movement the pusher engages and crowds the fibrous or cotton filling inward at its peripheral edge sufficiently to facilitate the turning or bending of the peripheral edges of the fabric discs inward toward each other in the manner next described. As the edges of the fabric and cotton filling engage and slide past the inner concave surface of the tongue 33, which concavity gradually increases toward the free end of the tongue, said concave surface acts upon the peripheral edges of the fabric discs to gradually turn or bend them toward each other to the approximate position shown in the drawings. In other words, the edge portions of the fabric discs are turned into a plane approximately at right angles to the plane of the main body of each disc and the two edges are preferably brought into approximate abutment by the time they reach the needle. The needle then passes its thread 43 through said edges of the fabric discs and the looper passes the looper thread 44 back and forth across the tongue or finger 33 and into positions for interlocking engagement with the needle thread where the latter is projected through and below the lower fabric disc 41 and then with the needle thread above the upper fabric disc 40, and so on. (See Figs. 1 and 4.)

The carrying of the looper thread back and forth across the tongue 33, and the presence of said tongue at a time when the threads and stitches are set, prevents the formation of stitches of undesirable tightness such as to mar the appearance of the seam or be otherwise objectionable. The feeding of the materials past the finger 33 causes the looper threads to slide along and off the free end of said finger, which also serves the usual function of a chaining-off finger.

With reference to Figs. 12-29, said figures illustrate a preferred machine or apparatus embodiment in accordance with the present invention, said embodiment being shown in conjunction with the stitch-forming mechanism (excluding the feeding mechanism, as will further appear) of the commercially well-known Willcox & Gibbs Sewing Machine Company's "overlock," or overseaming machine, using in the present instance a needle thread and a looper thread. It will be understood, however, that the invention is not limited to use with this particular machine and that other commercial types can be as conveniently adapted for use with the invention, for example, the Singer Sewing Machine Company's "zigzag" machine, and the overseaming machines of the Merrow Company.

In understanding the description of the adaptation of the "overlock" machine to the invention shown in Figs. 12-29, convenient reference may be had to U. S. Patent 472,095 showing an early embodiment of said machine. The feeding and trimming parts of the machine must be removed and the bed plate "A" (Fig. 1 of patent) cut away from beneath the sewing mechanism to make room for the apparatus embodying the invention. The upper left-hand corner of bed plate A is utilized to form a support for the apparatus embodying the invention and the hinge at the upper side of said bed plate may be used to attach the assembled mechanisms in the box casing shown in the figures illustrating the embodiment. Parts identified in the patent as main drive shaft a, rock shaft c; as well as the bed plate A, are given the same identifying symbols where they appear in the application drawings (Figs. 14, 15 and 17) and a comparison of said figures with those of the patent will further indicate how the sewing mechanism is adapted for use with the invention.

As mentioned above, bed plate A forms the support for the apparatus of the invention. Work plate 51 covers the front of the machine and projects over the front edge of the casing to provide extra surface room around the puff feeding mechanism. The hinge 52 (only the forward half is shown in the figures) allows the mechanism to be tilted out of the box casing, by removal of the work plate and raising the handle 53 upward in the slot 54.

55 is the lower hook-shaped frame member (seen at the lower left of Figs. 14 and 15) having an upstanding collar 56 passing through a circular hole in bed plate A and secured therein by four screws 57. Tubular member 58 is mounted for axial movement in collar 56 and is prevented from vertical movement by set screw collars 59 and 60. Member 58 provides a housing for drive shaft 61, whose lower extremity is journaled in member 55. Lower horizontal frame member 62 is provided with a split sleeve clamp 63 at its upper left-hand extremity whereby it is clamped to the tubular member 58, and at its lower left-hand end it has a bearing on shaft 61. The right hand portion of frame member 62 is provided with an upstanding split sleeve clamp 64 above the opening 65, which sleeve encloses the hollow standard 66 of lower cup-like support 96 containing the lower parts of the puff feeding mechanism.

Extending horizontally from the upper end of tubular member 58 is the yoke-shaped supporting arm 67, the branches of said yoke providing bearings and support for the immediate driving mechanism of the upper parts of the puff feeding apparatus.

Both upper and lower puff holding and feeding means are designed for synchronous rotary feeding movement as generally described in reference to the apparatus of Figs. 7-11. Power for said means is derived, in the present example, from the rock shaft c of the "overlock" machine. As will be seen with particular reference to Figs. 14 and 22, the front end of rock shaft c is provided with a driving eccentric 71 having a vertically disposed slot or track 72 therein. In said track is disposed the adjustable slide pivot screw 73 seen in detail in Fig. 23. Said pivot screw transmits more or less of the motion of rock shaft c, depending upon its location relative to the center of track 72. Pivot screw 73 and upper arm 74 are provided with ball joints 75 and 76 and connected by link 77. Arm 74 is pivoted on the upper end of vertical shaft 78, the latter being journalled for rotary movement in the horizontal frame member 62. Arm 79, on the lower extremity of shaft 78, is connected to the actuating member 80 of clutch 84, by a link 81 provided with a slide screw 82 (for driving adjustment purposes in the slot 83 of said member 80).

The interior details of clutch 84 are not shown, but it may be of any suitable design commonly used in the sewing machine art. Said clutch transmits uni-directional intermittent movement to the drive shaft 61. Upper and lower sprockets 85 and 86 mounted on said shaft are connected by chains 87 and 88 to the upper and lower sprockets 89 and 90 on the upper and lower shafts 94 and 95, respectively. Shafts 94 and 95 directly operate the upper and lower puff feeding means. Handle 91 at the top of shaft 61 may be used for manual rotary operation of the puff-feeding parts. Take-up wheels 92 and 93 bearing on chains 87 and 88, respectively, are provided for adjusting the tension thereof.

The main parts of the lower half of the puff-feeding means (see particularly Figs. 14 and 15) comprise shaft 95, a cup-like puff support or clamping member 96, feeding disc 97, circular top plate 98, rod 99, and spring 100. Cup-like support 96 is held in the sleeve clamp 64. Shaft 95 is tubular and adapted for axial rotation in support 96 and the opening 65 of the support 62. Disc 97 fits over the top of shaft 95 and is affixed thereto by a set-screw. A central circular opening in disc 97 of the same bore as the interior of tubular shaft 95 provides an opening for the screw socket of the top plate 98 mounted on rod 99. Rod 99 is slidable in the screw collar 101; and plate 98 and rod 99 are held in a position approximately in the same plane with the work-plate (as shown in Fig. 15) by the spring 100.

Top plate 98 and rod 99 are made rotatable with disc 97 and shaft 95 by the connecting pin 102 depending from plate 98 and engaging a hole 103 in disc 97. Disappearing feed pins 104 (only two shown in Fig. 15) arranged circularly in disc 97, pass through suitable holes in top plate 98 and will protrude therethrough when plate 98 is depressed.

Figures 17, 18, 19, 20, 21:
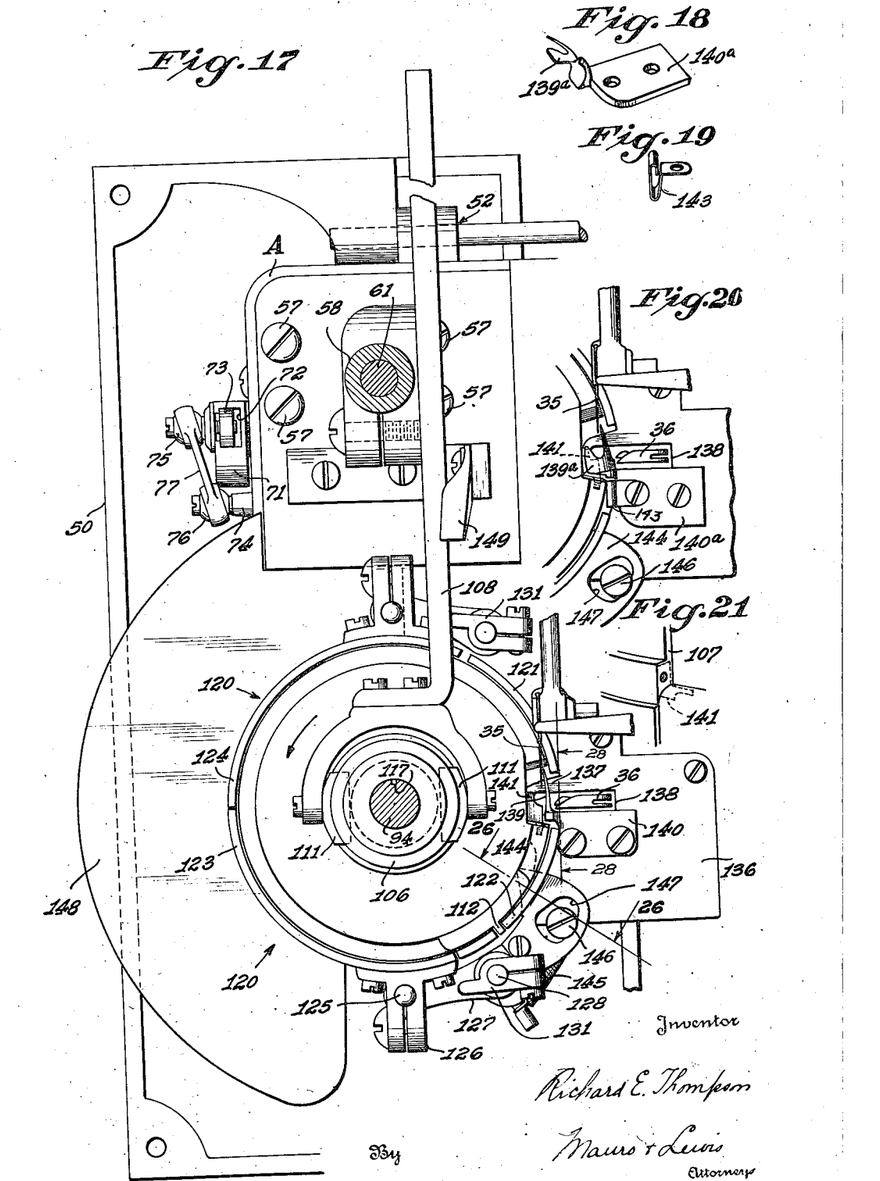
Fig. 17 is a top plan view on a larger scale on the line 17—17 of Fig. 14 and with the top plate of the box casing omitted.
Fig. 18 is a detail perspective view of a modified chaining finger and of a plate carrying said finger.
Fig. 19 is a detail perspective view of a ribbon guide.
Fig. 20 is a top plan view, corresponding to part of Fig. 17, but showing the parts separately illustrated in Figs. 18 and 19 combined with the stitch-forming mechanism.
Fig. 21 is a detail perspective view showing in dotted lines the guide for the edge of the powder puff which is removable to accommodate the ribbon feeding attachment illustrated in Fig. 18.

The main parts of the upper half of the puff feeding means comprise shaft 94, circular top plate 105, sleeve-like member 106, cup-like clamping member 107, and lever arm 108. The top plate 105 is carried by the lower end of shaft 94. Member 106 is vertically slidable on the hosel of top plate 105, upward movement thereof being limited by a set-screw collar 109. The cup-like member 107 fits slidably over member 106 and is provided with a lower rim having a semi-circular inner periphery corresponding to that of cup-like support 96. Member 106 is provided with a depending pin 102a (similar to pin 102) engaging an opening in top plate 105 so that member 106 is rotatable with plate 105. Member 107 is held against rotation by a projection 112 engaging a vertical slot in the centering rim or flange 122 (Fig. 17). Member 106 is also provided with disappearing feed pins 104a passing through suitable openings in top plate 105. Pins 104a are arranged in a larger circle than pins 104 to prevent interference therewith.

Figures 25, 27:
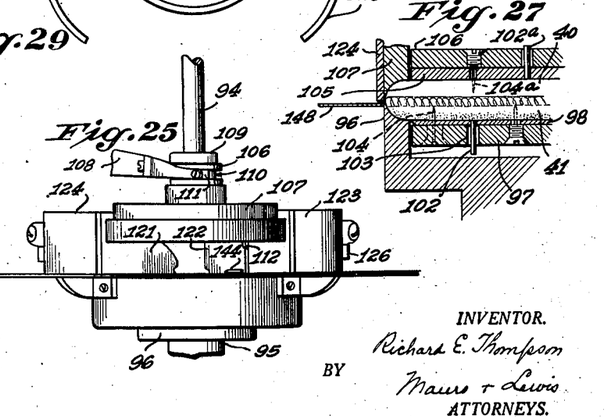
Fig. 25 is a front elevation of Fig. 24.
Fig. 27 is a fragmentary vertical sectional view of the cup-shaped puff holding members in closed operative position, and showing a powder puff therein in elevation.
Figure 29:
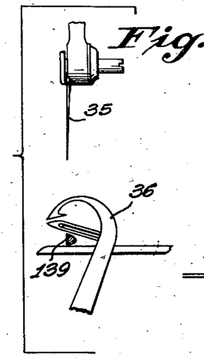
Fig. 29 is a fragmentary detail view, partly in section, on line 29—29 of Fig. 24, showing the same parts of the sewing mechanism of Fig. 28 in a different relative position.

A peripheral groove 110 near the upper edge of member 106 is adapted to receive the engaging tongues 111 of the forked lever arm 108 (see Fig. 17). Lever arm 108 is pivoted at its center to the support 58 and by depressing the handle of said lever (preferably by a foot-treadle connection, not shown), the upper puff feeding mechanism may be elevated as shown in Fig. 25. To accommodate this movement, shaft 94 is vertically slidable in the yoke of supporting arm 67 and is held therein by set-screw collar 115. The driving connection between sprocket 89 and shaft 94 is by means of a projection 116 on the interior of the hollow collar of said sprocket, engaging in the groove 117 of the shaft (see Fig. 15).

Figures 22, 23, 24, 26, 28:
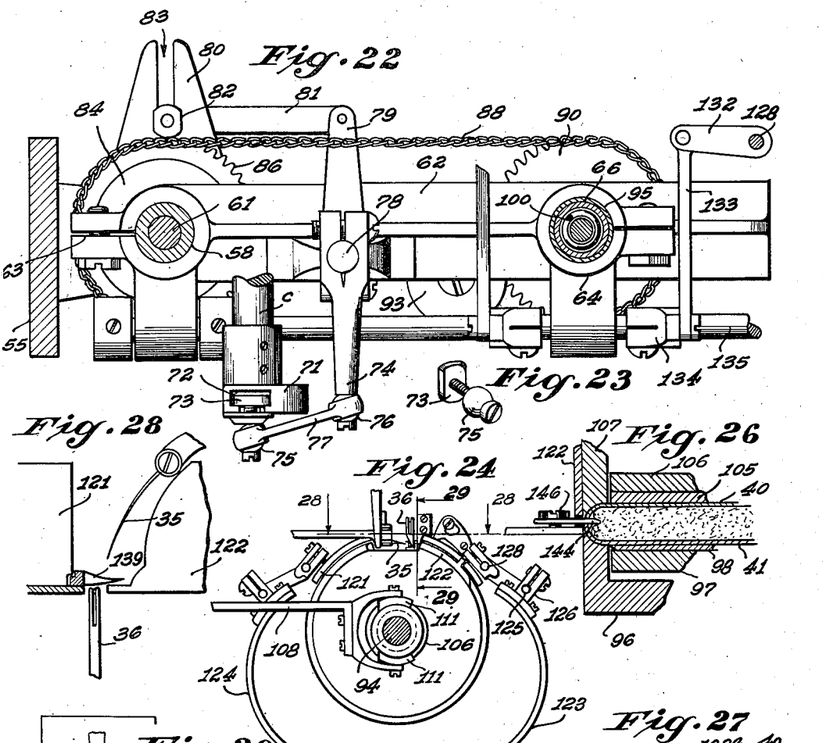
Fig. 22 is a top plan view (on a scale corresponding to the scale of Fig. 17) at a horizontal plane beneath the top plate of the box casing and with some parts omitted.
Fig. 23 is a detailed perspective view of the adjustable slide pivot-screw of the driving eccentric at the end of the rock shaft of the sewing machine.
Fig. 24 is a top plan view on a reduced scale on line 24—24 of Fig. 14, showing the centering rims or flanges of the puff holder swung to open position.
Fig. 26 is a fragmentary view, in vertical section on lines 26—26 of Fig. 17, with a powder puff shown in position in the puff holder.
Fig. 28 is a fragmentary detail view, partly in section on line 28—28 of Fig. 17, showing the sewing mechanism including the needle, chaining-off finger, and looper.

The circular walls of the powder puff forming and feeding mechanism consist generally of centering rims 120, which rims include fixed rim portions 121 and 122 adjacent the stitch-forming mechanism and swinging rim portions or gates 123 and 124, adapted to open outwardly, as shown in Figs. 24 and 25, to give access to the feeding mechanism. Rims 121 and 122 are mounted on the rear periphery of lower cup-shaped member 96. The pivotal mounting and operating means of gates 123 and 124 is shown generally in Figs. 12, 14, 24 and 25, and in detail in Fig. 14A.

Figures 14, 14A, 14B:
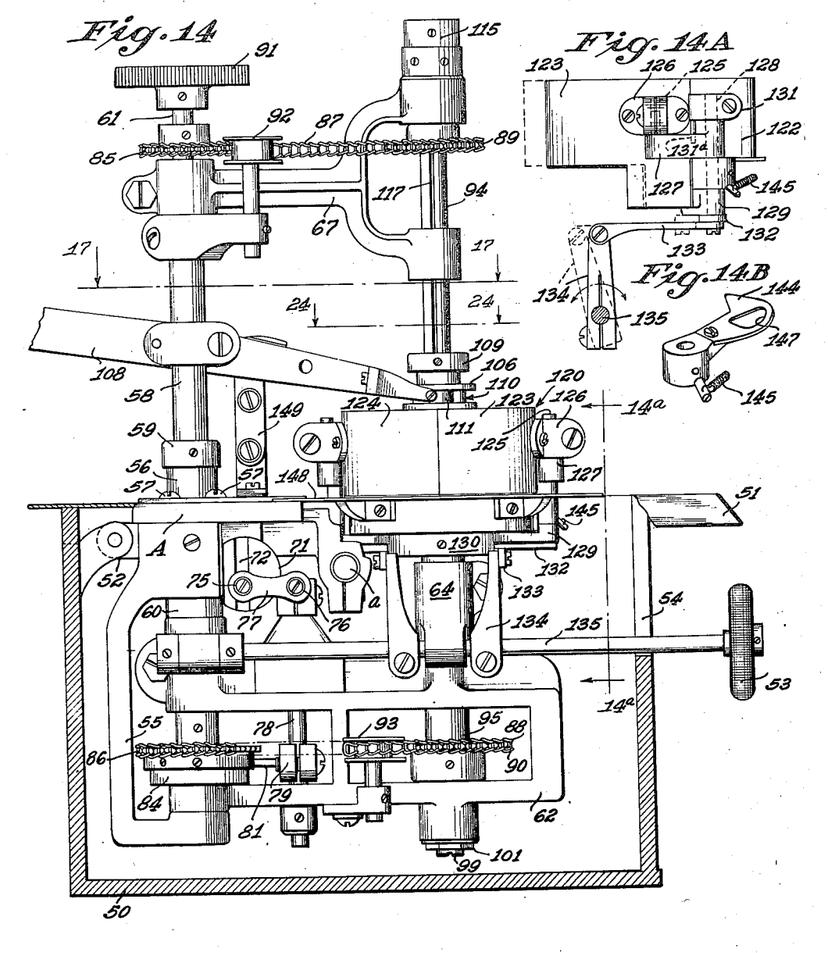
Fig. 14 is a front elevation of the machine, with the base or box casing in vertical section.
Fig. 14A is a view in elevation looking from the right on line 14a—14a of Fig. 14.
Fig. 14B is a detail perspective view of the pivoted swinging pusher of the embodiment shown in Figs. 12–29.
Figure 15:
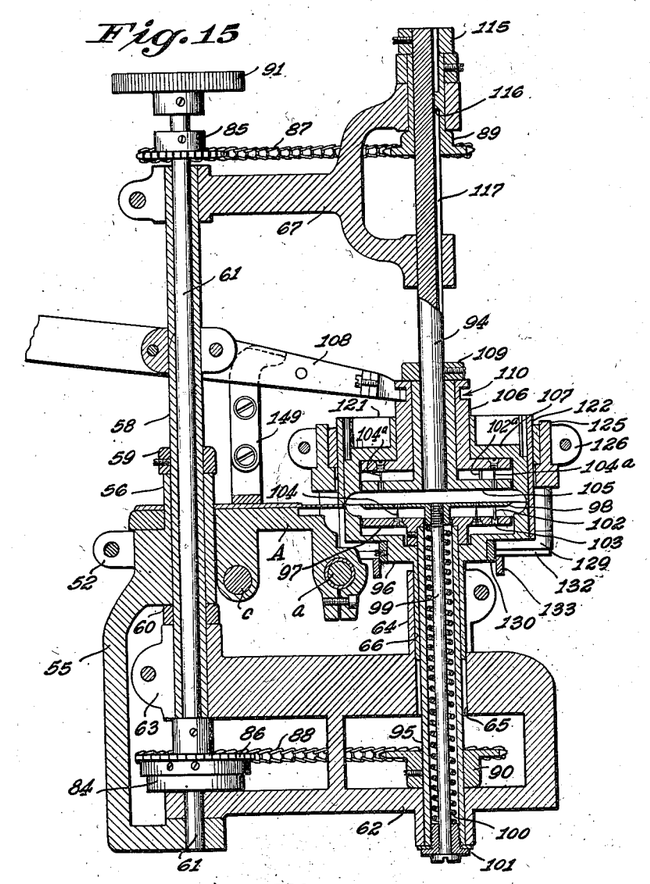
Fig. 15 is a vertical sectional view on the line 15—15 of Fig. 12, with the base casing omitted.

Fig. 14A shows the gate 123 (the right-hand gate in Fig. 14). Said gate is attached to the upright pin 125 by the clamp 126. Pin 125 forms one end of the arm 127 on the pivot shaft 128 journaled in an arm 129 of the ring support 130; which support is screwed to the base of the cup-like support 96. Clamp 131 on shaft 128 has a connecting pin 131a engaging a hole in arm 127. (Shaft 128 also is the pivot means for the pivoted swinging pusher member 144 shown in Fig. 14A, which member will be described presently.)

Shaft 128 is actuated by the interconnecting arms 132, 133 and 134, the latter thereof being clamped to the shaft 135 and operated by handle 53. Counter-clockwise movement of said handle causes the opening of gates 123 and 124 to the position shown in Figs. 24 and 25. The left-hand gate 124 and operating means correspond in detail to gate 123 and its operating means just described.

Details of the parts adjacent the stitch-forming mechanism will now be described with particular reference to Figs. 16–21. Needle 35 and looper 36 operate in the opening rims 121 and 122 adjacent a cut-away portion in support 96 and member 107. Throat plate 136, is screwed to bed plate A (not shown in Figs. 16–21) and has a tongue 137 projecting into said opening, and a slot 138 for looper 36. Chaining finger 139 is formed integrally with plate 140 screwed to throat plate 136. The operation of needle looper and chaining finger is the same as described with reference to Figs. 7–11.

Figures 16, 16A:
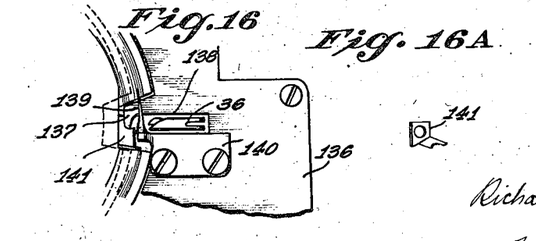
Fig. 16 is a fragmentary top plan view of parts at the point of stitch formation.
Fig. 16A is a detail perspective view of a guide for the edge of the powder puff located immediately in advance of the needle and point of stitch formation.

Guide 141, shown in detail in Fig. 16A, is attached to member 107 in the dotted-line position shown in Fig. 21. The purpose of said guide is to continue the concave powder-puff shaping rim of member 107 to a point immediately adjacent the stitch-forming mechanism.

Figure 5:
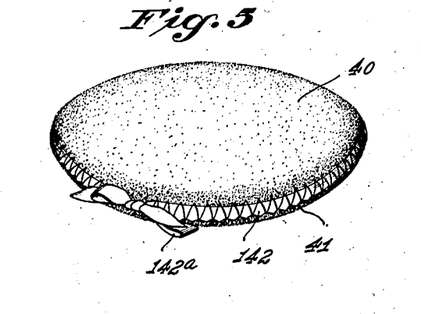
Fig. 5 is a perspective view of another powder puff of the present invention and which differs from the powder puff of Fig. 1 principally in the addition of a narrow ribbon extending completely around the periphery of the puff with its ends tied in a bow and with said ribbon running beneath and held in place by those portions of stitch-forming thread which extend across the joint between the meeting edges of the fabric discs.
Figure 6:
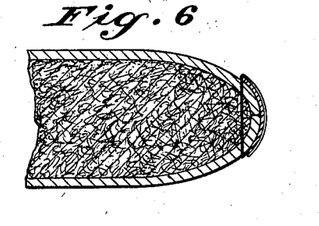
Fig. 6 is a transverse sectional view through a portion of the puff shown in Fig. 5.

Figs. 18–20 show the special parts needed to form the product shown in Figs. 5 and 6, viz., a powder-puff having a strip or ribbon 142 sewn around its periphery, and covering the seam between puff discs 40 and 41. The ends of the ribbon may be formed into the bow 142a, or sewed flat, as preferred. Fig. 18 shows a combined chaining finger and guide 139a, which takes the place of chaining finger 139 and guide 141. Ribbon guide 143 is shown in detail in Fig. 19 and in assembled position on plate 140a in Fig. 20. A ribbon fed through guide 143 to the inner concave surface of chaining finger 139a will be sewed to the puff as shown in Fig. 6 with the looper threads passing around the outer surface of the ribbon.

Figure 9:
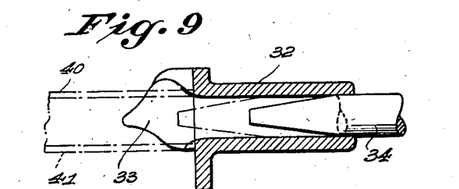
Fig. 9 is a vertical section on line 9—9 of Fig. 7.
Figure 10:
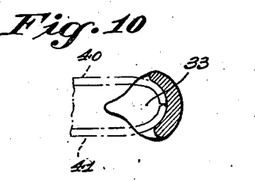
Figs. 10 and 11 are detail sectional views on the lines 10—10 and 11—11 respectively of Fig. 7.

Fig. 14A shows the fin-shaped pivoted swinging pusher member 144 which performs a service similar to that of pusher 34 (Fig. 9). Pusher 144 is pivotally mounted on shaft 128 and the point thereof engages the filler of a powder puff through a slot in rim 122 in the manner shown in Fig. 26. Spring 145 (Figs. 14A, 14B and 17) maintains the engagement, and screw 146 secured to plate 136 operating against the curved wall of hole 147 causes the pusher 144 to be withdrawn from the work when the puff-feeding mechanism is moved away from the stitch-forming mechanism, as will presently be described.

Figures 12, 13:
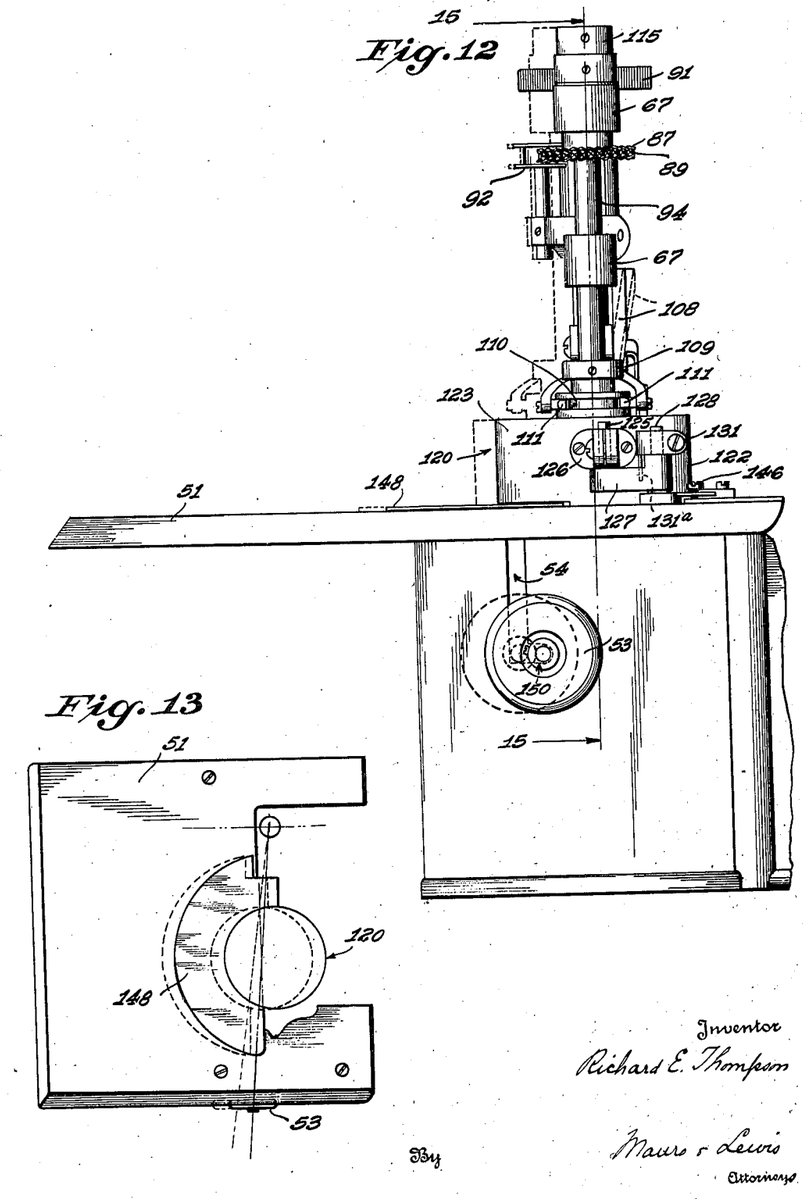
Fig. 12 is a view in elevation of the machine, from the right-hand side.
Fig. 13 is a partly diagrammatic top plan view on a reduced scale of some of the parts shown in Fig. 12.

It has been previously stated how both upper and lower portions of the puff-feeding mechanism were pivotally mounted or swung on the tubular support 58, the latter being rotatably movable in collar 56. This movement is provided to permit the puff-forming mechanism to be engaged and disengaged from the stitch-forming mechanism. Said movement is controlled by pushing the handle 53 sideways in the angle 150 of slot 54 (see Fig. 12). Dotted-line positions in Figs. 12, 13 and 16 show the extent of this movement. A supplementary work-plate 148 bracketed to support 96 and slidable over work plate 51 (see Figs. 12, 13, 17 and 25), covers the gap between fixed work plate 51 and the puff-feeding mechanism necessary for this movement. Lock-arm 149 prevents the operation of lever 108 for raising the upper puff-feeding mechanism, unless the assemblage is in the disengaged, or dotted line, position, and also prevents a return to the engaged position unless the upper puff-feeding mechanism is closed or down.

In operation, the mechanism is first disengaged from the needles as described. Gates 123 and 124 are then opened by turning handle 53; the upper portion of the puff-forming mechanism is raised and powder-puff materials such as shown in Fig. 2 are laid or slid onto top plate 98. Closing gates 123 and 124 will then "center" the puff on plate 98, and lowering of the upper mechanism will press the puff between the concave rims of the puff holder into the required shape, with the feed pins 104 and 104a piercing and holding the puff for rotation. The mechanism is then moved toward the stitching means, releasing pusher member 144 for engagement with the filler of the puff.

The sewing machine is then started, and the synchronously driven feeding mechanism will intermittently rotate the puff stitch-by-stitch. When the entire periphery of the powder-puff is sewn, the opening operation is then repeated.

Some of the advantages realized by the present invention are as follows:

(a) There is a saving of the considerable quantity of relatively expensive fabric (such as velours) that is left beyond the line of stitches and then turned to the inside in machine-made powder puffs as now commonly manufactured. It is the practice to leave as much as one quarter of an inch margin beyond the line of stitches, which means one-half inch in the diameter of the pads. The present invention eliminates any such margin with a considerable saving in the amount of relatively expensive fabric required.

(b) The present invention eliminates the step of turning puffs right side out through an opening provided for that purpose, which is a step in the production of puffs as now commonly manufactured.

(c) The present invention dispenses with the operation of inserting the fibrous filling (such as cotton) through said opening after the puff is turned right side out and of distributing said filling within the pad.

(d) The present invention avoids and saves any operation of hand-sewing to close said opening. This hand-sewing, even when expertly done, does not preserve the true circular outline, in other words, results in an irregular patchy outline which mars the appearance of the finished article.

(e) The embodiment represented in Figs. 12-29 permits the speedy and accurate preparation of powder-puffs according to the invention. Improvements in the apparatus include the novel upper and lower clamping discs having puff-shaping inner flanges operating on the edges of the entire puff except immediately at the stitch-forming means; the upper and lower retractible or disappearing feed pins, the spring actuated and automatically retracting pusher means cooperating therewith; the novel "gate" arrangement and accessory parts enabling rapid placing and replacing of the puff materials in the feeding means; and the driving and feeding arrangement in general.

(f) Improvements in the product further include the novel powder-puff with attached ribbon and the means for making the same.

The invention relates particularly to powder puffs, but that term is to be understood as embracing any other articles to the production of which the invention is applicable.

What is claimed is:

1. Apparatus for making powder puffs including in combination, stitch-forming means having a thread-carrying fabric-penetrating needle; movable work-supporting and feeding means adapted to hold together two discs or pieces of suitable fabric of similar outline and an interposed filling and to feed the edge portions thereof past said stitch-forming means; means for pushing the interposed filling inwardly from the edges of said discs; and means acting upon said discs to turn or bend the edge portion of each disc out of the plane of its main body portion and toward the other disc and to bring the edges of the two discs into contact with each other and to maintain said edges in said position for the needle to penetrate said turned or bent portions in the formation of stitches by the stitch-forming means.

2. Apparatus for making powder puffs including in combination, stitch-forming means having a thread-carrying fabric-penetrating needle; movable work-supporting and feeding means adapted to penetrate and hold together two discs or pieces of suitable fabric of similar outline and to feed the edge portions thereof past said stitch-forming means; and edge-shaping means having opposed concave rims extending around substantially the entire edge portion of each disc and adapted to turn or bend each edge portion out of the plane of its main body portion and toward the other disc and to bring said portions into contact with each other and to maintain said portions in said position for the needle to penetrate said turned or bent portions in the formation of stitches by the stitch-forming means.

3. Apparatus according to claim 2, wherein the movable work-supporting and feeding means comprises clamping members having penetrating pins for engaging and holding the fabric discs.

4. Apparatus according to claim 2, wherein the movable work-supporting and feeding means comprises clamping members having penetrating pins adapted to engage and hold the fabric discs when said clamping members are closed on said discs, and means for bringing said pins out of engagement within said members when said members are opened.

5. Apparatus for making powder puffs including in combination, stitch-forming means having a thread-carrying fabric-penetrating needle; movable work-supporting and feeding means adapted to hold together two discs or pieces of suitable fabric of similar outline and to feed the edge portions thereof past said stitch-forming means; and fabric-penetrating means for piercing and holding said fabric discs brought into engagement with said discs from within said work-supporting and feeding means when said latter means are in operative position; and edge-shaping means having a surface in advance of said needle for engagement with said edge portions, said surface having a curvature complementary to the curvature desired at the seam of the puff in its finished condition, so that said discs are sewed in edge-to-edge relationship with their edge portions curved or bent accordingly.

6. Apparatus according to claim 5, wherein said fabric-penetrating means are adapted to withdraw from said fabric discs into said movable work-supporting and feeding means when said latter means are disengaged from operative position.

7. Apparatus according to claim 1, wherein the means for pushing the interposed filling inwardly from the edges of the discs consists of a fin-like member pressing against the filling in advance of the stitch-forming means.

8. Apparatus according to claim 1, wherein the means for pushing the interposed filling inwardly from the edges of the discs consists of a pivoted spring-actuated fin-like member pressing against the filling in advance of the stitch-forming means.

9. Apparatus for making powder puffs including in combination, stitch-forming means having a thread-carrying fabric-penetrating needle; work-supporting and feeding means adapted to hold together two discs or pieces of suitable fabric of similar outline and to feed the edge portions thereof past said stitch-forming means; said work-supporting and feeding means including upper and lower cup-like work-holding members having opposed concave rims adapted to turn or bend the edge portion of each disc out of the plane of its main body and toward the other disc in the shape of a powder puff; rotary feed plates disposed in said work-holding members, and means for turning said discs for the feeding movement.

10. Apparatus according to claim 9, wherein the upper cup-like work-holding member is provided with lifting means for raising or opening said work-supporting and feeding means.

11. Apparatus according to claim 9, said work-supporting and feeding means being mounted for lateral movement with respect to said stitch-forming means for engagement or disengagement therewith.

12. Apparatus for making powder puffs including in combination, stitch-forming means having a thread-carrying fabric-penetrating needle; movable work-supporting and feeding means rotatable around an axis located at a predetermined distance from said needle and having surfaces adapted to hold together two discs or pieces of suitable fabric of similar outline and to feed the edge portions thereof past said stitch-forming means, and edge-shaping means horizontally curved to bear against the outline of said discs and curved in the vertical direction to such degree that said edge portions of each disc will be bent out of the plane of its main body toward the other disc and brought into approximate edge-to-edge abutment and passed in this condition to the needle for the sewing operation.

RICHARD E. THOMPSON.